United States Patent [19]
Washizu
[11] Patent Number: 5,072,710
[45] Date of Patent: Dec. 17, 1991

[54] FUEL DELIVERY RAIL ASSEMBLY

[75] Inventor: Katsushi Washizu, Numazu, Japan
[73] Assignee: Usui Kokusai Sangyo Kaisha Ltd., Shizuoka, Japan

[21] Appl. No.: 517,037
[22] Filed: May 1, 1990
[30] Foreign Application Priority Data
May 6, 1989 [JP] Japan ........................ 1-51958[U]
[51] Int. Cl.[5] ........................ F02M 55/02; F16L 41/00
[52] U.S. Cl. ........................ 123/470; 123/456; 123/469; 285/222; 285/189; 239/550
[58] Field of Search ........................ 123/472, 470, 468, 469, 123/456; 285/150, 156, 222, 196, 189; 239/550, 551

[56] References Cited

U.S. PATENT DOCUMENTS

| | | | |
|---|---|---|---|
| 972,119 | 10/1910 | McKibben | 285/189 |
| 1,896,028 | 1/1933 | Burvenick | 285/222 |
| 3,512,808 | 5/1970 | Graham | 285/189 |
| 3,841,667 | 10/1974 | Sands | 285/222 |
| 3,971,500 | 7/1976 | Kushner | 285/189 |
| 4,214,781 | 7/1980 | Joseph | 285/222 |
| 4,457,280 | 7/1984 | Hudson | 123/470 |
| 4,660,531 | 4/1987 | Lauterbach | 239/550 |
| 4,718,700 | 1/1988 | Horch | 285/156 |
| 4,751,904 | 6/1988 | Hudson | 239/550 |
| 4,792,160 | 12/1988 | Hwang | 285/150 |

FOREIGN PATENT DOCUMENTS

| | | | |
|---|---|---|---|
| 0571296 | 2/1933 | Fed. Rep. of Germany | 285/222 |
| 0527182 | 10/1957 | Italy | 285/222 |
| 57-84362 | 5/1982 | Japan . | |
| 58-144068 | 9/1983 | Japan . | |

*Primary Examiner*—Carl Stuart Miller
*Attorney, Agent, or Firm*—Wenderoth, Lind & Ponack

[57] ABSTRACT

A fuel delivery rail assembly for supplying fuel to a plurality of fuel injectors in an engine is provided. The assembly comprises an elongated conduit having a rectangular section and a plurality of tubular sockets. The conduit and each socket are tightly combined with a connection utilizing a caulking deformation of an annular extension, which is formed within either the conduit or the socket. A seal member is disposed between the surface of the conduit and the bottom side of each socket.

2 Claims, 1 Drawing Sheet

FUEL DELIVERY RAIL ASSEMBLY

BACKGROUND OF THE INVENTION

This invention relates to a fuel delivery rail assembly for an internal combustion engine, especially for an automotive engine, equipped with a fuel injection system The fuel delivery rail assembly delivers pressurized fuel supplied from a fuel pump toward intake passages or chambers via associated fuel injectors. The assembly is used to simplify installation of the fuel injectors and the fuel supply passages on the engine.

An ordinary fuel delivery rail assembly having a rectangular section is constructed as shown in FIG. 5 of the drawings. In this assembly, an elongated conduit 61 is formed by a steel tube having a rectangular hollow section. To an end of the conduit 61, a fuel inlet pipe 67 for introducing gasoline fuel is secured, and to the other end of the conduit 61, a fuel return pipe 68 leading to an exit for residual fuel is secured, both pipes being welded to the conduit by copper brazing. To the inside of the conduit 61 and the pipes 67, 68, copper plating or nickel plating is coated for protecting the surfaces from rust and for keeping the fuel clean.

The conduit 61 comprises four walls and a fuel passage therein. To an outside surface of one wall, are attached a plurality of sockets 64, the number of which corresponds to the number of combustion cylinders. One end of each socket 64 communicates with the fuel passage, and the other end of each socket 64 is so formed as to receive an associated tip of a fuel injector In most cases, these sockets 64 are inserted into guide holes arranged within the wall of the conduit 61 at predetermined intervals, and welded thereto by copper brazing. The axial directions of the sockets 64 should precisely line up in alignment with the respective axial direction of the injectors. Furthermore, pitch lengths between adjacent sockets should precisely coincide with the corresponding pitch lengths between associated injectors. One of the objects of the present invention is directed to connecting problems between the conduit and the sockets.

In Japanese utility model public disclosure No. 84362/1982, two types of fuel delivery rail assembly are disclosed. One is a projection welding type in which the sockets and the conduit are connected by the projection welding, and the other is a die casting type in which the sockets and the conduit are integrally formed through a die casting process.

While welding type connections between the sockets and the conduit have met with some amount of technical success, they have not been as successful as might have been expected given that there have been several manufacturing problems due to a heat distortion. For the purpose of eliminating fuel leakage from the connections due to the heat distortion, it is necessary to carefully examine every assembly. If a defective connection is found, the assembly should be thrown away, resulting in an increase of manufacturing cost.

Furthermore, a surface treatment should be applied to the assembly after the welding process. Since the surface adjacent the socket is irregularly finished, it is difficult to maintain high quality of the surface treatment.

As an alternative construction, an integral type of die casted fuel delivery rail assembly is disclosed in the aforementioned public disclosure. However, it has been found that this kind of integral type cannot be prepared for complicated forms corresponding to miscellaneous engines.

In Japanese utility model public disclosure No. 144068/1983, there is disclosed an integral type of fuel delivery rail assembly in which plastic sockets are molded integral with a plastic conduit through an injection molding process. However, it has been found that it is considerably difficult to make a mold and a block insert for the molding process. Moreover, since the assembly has poor rigidity, it is easily bent thereby causing a fuel leakage or breakdown, which leads to a danger of fire.

SUMMARY OF THE INVENTION

It is an object of the present invention to overcome the above disadvantages in producing the fuel delivery rail assembly and to reduce defective parts.

Another object of the present invention is to eliminate a fuel leakage from a connection between the socket and the conduit.

A further object of the present invention is to improve a quality of a surface treatment for the assembly.

According to one aspect of the invention, there is provided a fuel delivery rail assembly for an internal combustion engine comprising an elongated conduit having a fuel passage of a generally rectangular hollow section, and a plurality of tubular sockets perpendicularly attached to one wall of said conduit at the bottom sides of the sockets, said bottom side of each socket being provided with a shoulder portion and an annular extension, said shoulder portion being seated on the, surface of said one wall of the conduit and having a seal member mounted therebetween, said annular extension being inserted into a guide hole disposed within said one, wall of the conduit and tightly fixed thereto by a sealing deformation of the extension.

According to another aspect of the invention, there is provided a fuel delivery rail assembly for an internal combustion engine comprising an elongated conduit having a fuel passage of a generally rectangular hollow section, and a plurality of tubular sockets perpendicularly attached to one wall of said conduit at the bottom sides of the sockets, said bottom side of each socket being seated on the surface of said one wall of the conduit and having a seal member mounted therebetween, said one wall of the conduit being provided with a corresponding number of guide holes and annular extensions projecting from the peripheries of the guide holes, each of said annular extensions being inserted into the associated socket and tightly fixed thereto by a sealing deformation of the extension.

Within the scope of the invention, a seal member is located between each socket and the conduit, so that a fuel leakage from the connection is effectively eliminated. Since the sockets and the conduit are connected by a sealing deformation of the annular extension, welding or brazing is no longer needed for the connection, whereby manufacturing steps are considerably simplified. Surface treatments can be applied to the socket and the conduit before they are connected, so that the quality of the surface treatment is considerably improved.

The socket itself can be made through miscellaneous manufacturing methods such as machining, forging or pressing from steel material, injection molding from plastic materials, or aluminum die casting in order to meet special requirements.

Other features and advantages of the invention will become apparent from a reading of the specification, when taken in conjunction with the drawings, in which, like reference numerals refer to like elements in the several views.

DESCRIPTION OF THE PREFERRED EMBODIMENT

Figure 1:
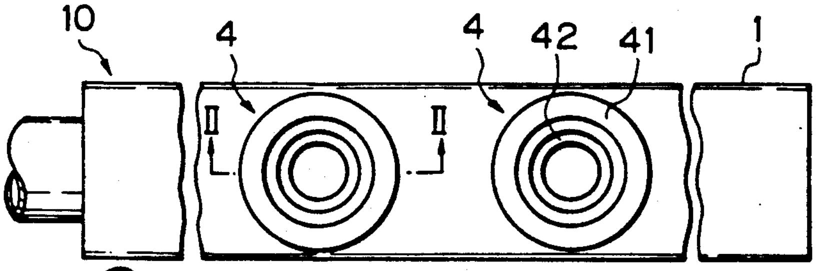
FIG. 1 is a partial plan view of the fuel delivery rail assembly according to the invention.
Figure 5:
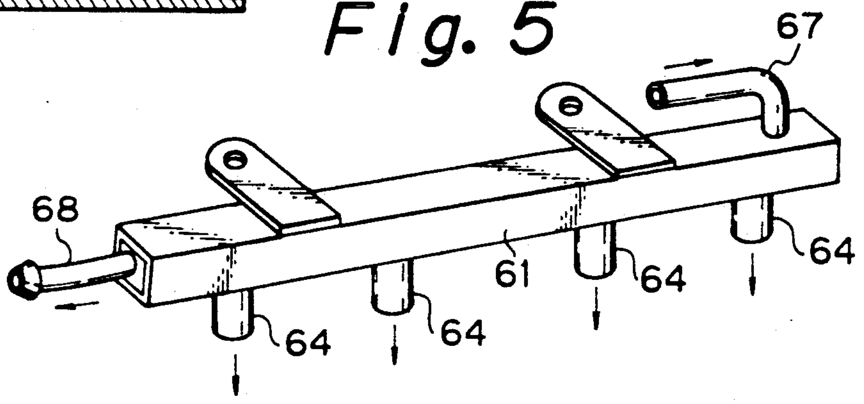
FIG. 5 is a perspective view of the fuel delivery rail assembly according to the invention.

Referring to FIG. 1, there is shown a partial portion of a fuel delivery rail assembly 10 according to the invention. Although some portions are omitted from FIG. 1, outside appearance of the assembly 10 is identical with that of FIG. 5. This assembly 10 is adapted to four cylinders on one side of an automotive V-8 engine.

The assembly 10 comprises an elongated conduit 1 having a fuel passage 2 a rectangular hollow section and four sockets 4 (only two sockets are illustrated) perpendicularly attached to a side wall 21 of the conduit 1. The sockets 4 are disposed along the longitudinal direction of the conduit 1 at predetermined intervals so as to be registered with the positions of fuel injectors.

Figure 2:
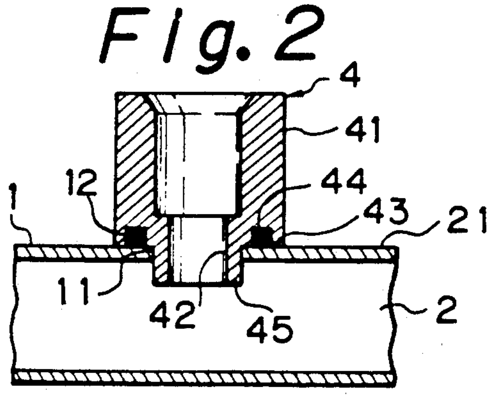
FIG. 2 is a vertical sectional view taken along the line II—II in FIG. 1 showing a connection between a fuel conduit and a socket.

As shown in the sectional view of FIG. 2, the upper side of the socket 4 comprises a tubular body 41 adapted to receive a tip of an associated fuel injector, and the bottom side of the socket 4 comprises a shoulder portion 43 and an annular extension 42. The shoulder portion 43 is provided with an O-ring groove 44. When the shoulder portion 43 is seated on the flat surface of the side wall 21, an O-ring 12 inserted into the O-ring groove 44 provides a sealing effect for preventing a fuel leakage therefrom.

Figure 3:
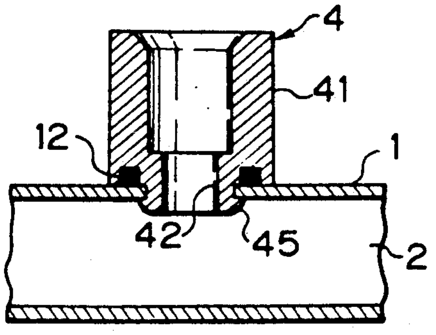
FIG. 3 is a vertical sectional view similar to FIG. 2 showing a result of a sealing deformation.

The annular extension 42 is inserted into a guide hole 11 disposed within the wall 21 of the conduit 1. The dimension and location of the guide hole 11 are precisely arranged in order to accomplish the aforementioned alignments between the sockets and associated fuel injectors. When the extension 42 is inserted into the guide hole 11, as shown in FIG. 2, the distal end 45 of the extension 42 is projected into the space within the conduit 1. Under this condition, a deforming tool is applied to the distal end 45, which is then expanded and folded back into a relatively flat configuration as shown in FIG. 3. Thus, the socket 4 is tightly fixed to the wall 21 of the conduit 1. Sealing effects are provided by the O-ring 12. Since the surfaces of the sockets 4 and the conduit 1 can be treated or plated before they are connected, it is not necessary to apply surface treatments after they are connected.

Figure 4:
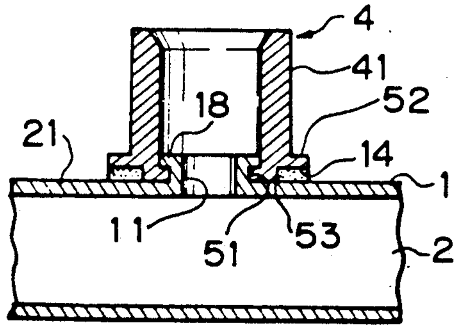
FIG. 4 is a vertical sectional view of an alternative embodiment of the invention showing another result of a sealing deformation.

FIG. 4 shows an alternative embodiment of the invention. In this embodiment, the bottom portion of the socket 4 comprises an inwardly extending circular flange 51, an outwardly extending circular flange 52 and a flat end 53. Around the periphery of the flat end 53, a circular space remains for receiving a seal member 14. When the flat end 53 is seated on the flat surface of the wall 21, the seal member 14 provides a sealing effect between the socket 4 and the conduit 1.

In this embodiment, an annular extension 18 extends from the periphery of the guide hole 11. After the socket 4 is seated on the flat surface of the wall 21, a caulking tool is applied to the distal end of the extension 18, which is then expanded and folded back into a flange-like configuration as shown in FIG. 4, thereby providing a tight engagement between the extension 18 and the flange 51. Thus, the socket 4 is tightly fixed to the wall 21 of the conduit 1. According to this embodiment, it is possible to make the conduit 1 by steel material and to make the socket 4 from plastic materials.

Thus, as is apparent from the above description, the fuel delivery rail assembly of the present invention can provide technical advantages as follows:

(a) Since many kinds of welding steps can be saved, manufacturing process is considerably simplified and defective parts are reduced in number.

(b) Since a seal member is located between a socket and a fuel conduit, fuel leakage from the connection is effectively eliminated.

(c) Since surface treatments can be applied to the socket and the conduit before they are connected, the quality of the surface treatment is considerably improved.

I claim:

1. A fuel delivery rail assembly for an internal combustion engine, comprising:

an elongated conduit having a plurality of guide holes formed in one wall thereof, and having a fuel passage of a generally rectangular hollow section;

a plurality of tubular sockets attached, at respective bottom sides thereof, to and extending perpendicularly from said one wall of said conduit;

said bottom side of each of said sockets being provided with an annular extension and a shoulder portion, said shoulder portion having a downwardly opening annular groove formed therein and being seated on said one wall of said conduit;

a plurality of seal members respectively mounted in said annular grooves of said shoulder portions of said sockets, and being disposed respectively between said shoulder portions and said one wall of said conduit; and each of said annular extensions being inserted into a respective one of said guide holes and being tightly fixed to said conduit by a deformation of its respective annular extension.

2. A fuel delivery rail assembly for an internal combustion engine, comprising:

an elongated conduit having a plurality of guide holes formed in one wall thereof, and having a fuel passage of a generally rectangular hollow section;

a plurality of tubular sockets attached, at respective bottom sides thereof, to and extending perpendicularly from said one wall of said conduit;

said bottom side of each of said sockets being seated on said one wall of said conduit;

a plurality of seal members respectively mounted between said sockets and said one wall of said conduit;

said one wall of said conduit being provided with a plurality of annular extensions projecting from peripheries of said guide holes, respectively; and each of said annular extensions being inserted into a respective one of said sockets, said conduit being tightly fixed to each of said sockets by a deformation of each of said annular extensions.

* * * * *